United States Patent
Berry et al.

(10) Patent No.: US 6,824,829 B2
(45) Date of Patent: Nov. 30, 2004

(54) PROCESS FOR MANUFACTURING THIN FILM STRIPS

(75) Inventors: Craig J. Berry, Westport, CT (US); Walter Klauser, Ringwood, NJ (US)

(73) Assignee: Acupac Packaging, Inc., Mahwah, NJ (US)

( * ) Notice: Subject to any disclaimer, the term of this patent is extended or adjusted under 35 U.S.C. 154(b) by 207 days.

(21) Appl. No.: 10/226,451

(22) Filed: Aug. 23, 2002

(65) Prior Publication Data

US 2004/0036193 A1 Feb. 26, 2004

(51) Int. Cl.[7] ............... B05D 3/02; A61L 15/62; B29D 7/01; F26B 15/00; A61K 7/16
(52) U.S. Cl. .............. 427/372.2; 427/358; 427/377; 427/2.29; 264/212; 264/213; 264/216; 34/446; 34/459; 34/483; 34/484
(58) Field of Search ................. 264/212, 213, 264/216, 217; 156/242, 247, 250, 272.2; 427/331, 356, 358, 372.2, 377, 2.29, 2.31, 177; 34/446, 459, 483, 484; 424/49, 410, 435, 439, 441, 443, 444

(56) References Cited

U.S. PATENT DOCUMENTS

| 4,562,020 A | * | 12/1985 | Hijiya et al. ............... 264/39 |
| 5,377,428 A | * | 1/1995 | Clark .......................... 34/446 |
| 5,629,003 A | * | 5/1997 | Horstmann et al. ......... 424/401 |
| 5,948,430 A | * | 9/1999 | Zerbe et al. ................ 424/435 |
| 6,419,903 B1 | * | 7/2002 | Xu et al. ...................... 424/49 |
| 6,596,298 B2 | * | 7/2003 | Leung et al. ............... 424/435 |

* cited by examiner

Primary Examiner—J. A. Lorengo
(74) Attorney, Agent, or Firm—P&G, LLP

(57) ABSTRACT

A method of forming a thin film strip. The method comprises coating a liner substrate with a wet slurry of film forming ingredients and drying the wet slurry in a drying oven to form a film. A moisture content of the film is measured as the film exits the drying oven and the film is rewound on itself. The rewound film is then stored in a minimal moisture loss environment during a curing process.

11 Claims, 7 Drawing Sheets

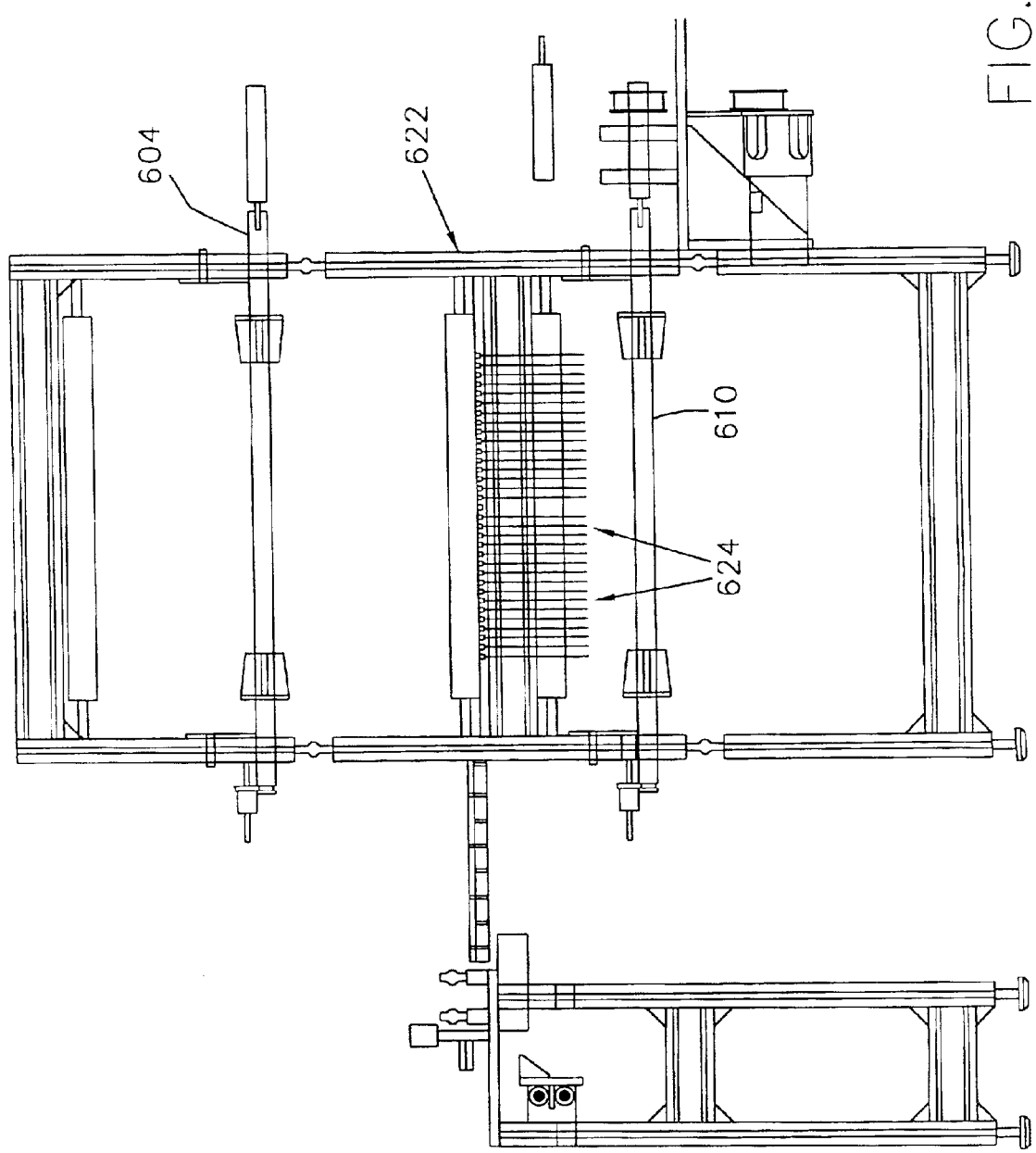

PROCESS FOR MANUFACTURING THIN FILM STRIPS

BACKGROUND OF THE INVENTION

Field of the Invention

The present invention is generally related to the processing of thin films, and in particular to the formation of coated film strips.

SUMMARY OF THE INVENTION

The present invention is directed to a method of forming a thin film strip. In one embodiment the method comprises coating a liner substrate with a wet slurry of film forming ingredients and drying the wet slurry in a drying oven to form a film. A moisture content of the film is measured as the film exits the drying oven and the film is rewound on itself. The rewound film is then stored in a minimal moisture loss environment during a curing process.

BRIEF DESCRIPTION OF THE DRAWINGS

The foregoing aspects and other features of the present invention are explained in the following description, taken in connection with the accompanying drawings, wherein:

FIG. 8 is an end view of the system illustrated in FIG. 6.

DETAILED DESCRIPTION OF THE PREFERRED EMBODIMENT(S)

Figure 1:
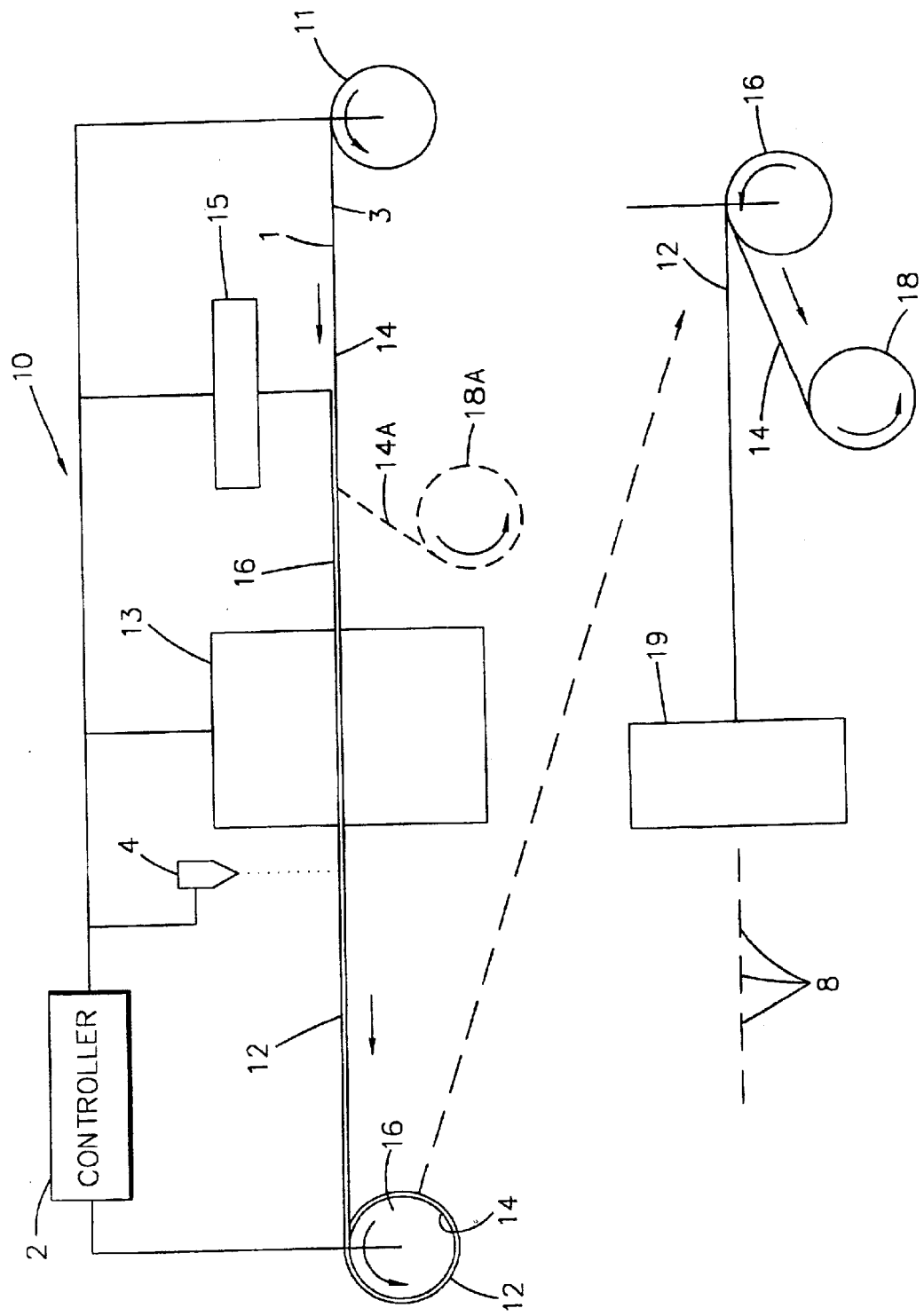
FIG. 1 is a schematic diagram of a system incorporating features of the present invention.

Referring to FIG. 1, a schematic diagram of a system 10 incorporating features of the present invention is illustrated. Although the present invention will be described with reference to the embodiment shown in the drawings, it should be understood that the present invention can be embodied in many alternate forms of embodiments. In addition, any suitable size, shape or type of elements or materials could be used.

As shown in FIG. 1, the system 10 is generally adapted to coat, dry and cut a relatively thin film forming material 12 into small strips 8. Preferably, each strip 8 of thin film 12 is approximately 1 inch×1 inch (2.54 cm×2.54 cm), although any suitable dimensions can be used. In one embodiment, the formed film 12 is adapted to be an edible film for oral intake and use.

The formed film 12 is generally a thin, dissolvable and ingestible film. The film is adapted to have a low tensile strength so that it dissolves readily when placed in the mouth, for example. The film 12 is generally formed by coating a film forming slurry 6 on a surface of a suitable substrate 14 and drying the film forming slurry 6 on the substrate 14. In one embodiment, a drying oven 13 can be used to dry the slurry 6. After drying, the substrate 14 can be delaminated from the dried coating or film 12. In an alternate embodiment, the substrate 14 can be delaminated from the coated slurry 6 after the coating stage. After drying, the dried film 12 can then be cut into strips 8 for subsequent packaging.

The slurry 6 generally comprises a mixture of film forming ingredients. During the coating stage, the slurry 6 is cast or coated onto the substrate 14. In one embodiment, a slot die is used to coat the wet slurry 6 onto the substrate 14. In alternate embodiments any suitable film forming coating or casting system can be used to coat the wet slurry onto the substrate, including for example, a knife over roll system. It is a feature of the present invention to be able to coat the slurry 6 onto the substrate 14 with a degree of accuracy wherein the thickness of the film forming slurry 6 is not dependent upon the thickness of the paper or substrate 14. In the preferred embodiment, the slot die can sit approximately 10 millimeters above the paper. The more slurry that is pumped, the more slurry that is coated onto the paper.

In one embodiment, the substrate 14 is a liner-backed paper stock. The substrate 14 can include a coating 1,3 on each side of the substrate that allows the slurry 6 or film 12 to be readily separated from the backer substrate 14, while still maintaining adequate surface tension. The coating 1 on one side of the substrate 14 is generally adapted to provide adequate surface tension to allow the film forming slurry 6 to spread out on the substrate as well as bond to the substrate 14. The coating 1 must also be able to provide sufficient release ability to allow the dried film 12 to be removed from the substrate 14. The coating 3 on the other side of the substrate 14 is generally adapted to allow the substrate 14 and film 12 to be rolled onto itself without any adhering effects. The coating 1, 3 on the backing substrate or paper 14 provides versatility and advantages over the properties of a heat belt or continuous web.

Figure 2:
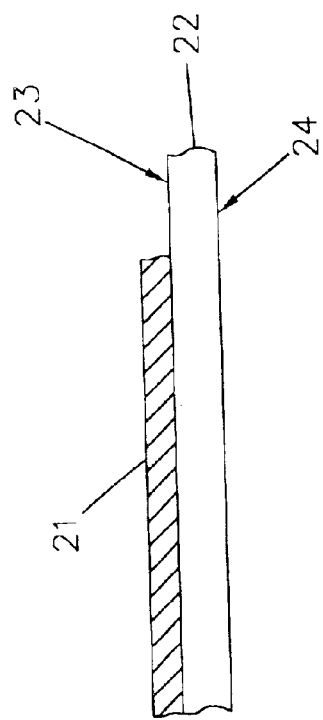
FIG. 2 is a side view of a substrate coated with a film forming slurry in the system illustrated in FIG. 1.

Referring to FIG. 2, an illustration of a wet film forming slurry 21 is shown coated or cast onto the substrate 22. In this embodiment, the substrate 22 comprises a liner-backer that is coated on both sides 23, 24. One side 23 is coated with for example, a silicon. The film forming slurry 21 is cast or coated onto the polyethylene side 23 of the substrate 22. In alternate embodiments, the substrate can include any suitable coating material that allows the film forming slurry 21 to release from the substrate 22 after it is dried as well as allow the side 23 of the substrate 22 coated with the film forming slurry 21 to be rolled onto itself.

Referring to FIG. 2, the polyethylene coating 23 on the substrate 22 enables the film forming slurry 21 to spread out over the polyethylene surface of the substrate. The film forming slurry 21 is coated or cast onto the polyethylene side 23 of the substrate 22 in a wet form. The polyethylene surface 23 provides the film forming slurry 21 with a surface that it can bond to, but still provides a "release ability" that enables the film forming slurry fibers to be relatively easily removed after further processing. The surface tension of the polyethylene surface 23 allows the film forming slurry 21 to remain relatively flat as the slurry 21 is coated onto the substrate, but the surface tension is not too much to keep it from coming off or being removed during subsequent processing. The relationship of the paper or substrate 22 to the slurry 21 is important to the overall process.

Referring to FIG. 1, after the film forming slurry 6 has been coated onto the substrate 14, the combination of the substrate 14 and slurry 6 is passed through a drying oven 13. The drying oven 13 is generally adapted to dry the slurry 6 while retaining the flavor content of the slurry 6 in the film 12 formed by the drying process. Although a drying oven 13 is shown and described, any suitable drying device can be used that is adapted to dry a film forming slurry while retaining flavor in the resulting product. It is a feature of the present invention to minimize the amount of flavor "flashed" off the drying slurry.

The drying oven 13 generally comprises a through drying oven that is adapted to heat and dry the film forming slurry 6 at relatively low temperatures and low speeds. In one embodiment, the drying oven 13 is a multizone reflow oven in which the drying temperature can be varied in every zone. The drying temperatures in the oven 13 can be "ramped up" slowly as substrate with the film forming slurry thereon travels through the oven.

The amount of air flowing through the oven is recirculated in order to keep the flavor in the ambient environment. Approximately 70% of the air can be recirculated in order to assist in retaining the flavor in the resulting film 12. The combination of drying at low temperatures and low speeds and recirculating air, helps in minimizing the amount of flavor that is flashed off during the drying process. By maintaining a certain amount of flavor in the ambient environment during drying, more flavor is retained in the resulting dried film 12.

As shown in FIG. 1, the system 10 can further include moisture meter 4. The moisture meter 4 is generally adapted to measure a moisture content of the film 12 as it exists in the oven 13. In one embodiment, the moisture meter 4 comprises an inline, infra-red moisture meter. In alternate embodiments, any suitable moisture detection system can be used to determine moisture content of a film. It is a feature of the present invention to continuously monitor a moisture content of the film 12 as it exists in the drying oven 13 and control a speed of the drying process on the basis of the measured moisture content. In one embodiment, the inline moisture meter 4 traverses the web of the film 12 as it exits the drying oven. For manufacturing and production purposes the film 12 should not be too wet or dry. In one embodiment, the residual moisture content of the film 12 as it exists in the drying oven 13 should be in the range of 16–19% of water content by weight. In alternate embodiments, any suitable residual moisture content can be used that achieves a desired product. It is a feature of the present invention to correlate the measured residual water content of the dried film to the speed of the substrate 14 and web as it passes through the drying oven 13. For example, if the residual moisture content reading is higher than desired, the controller 2 is adapted to adjust the speed of the web so that more time is spent traveling through the drying oven. In one embodiment, the controller 2 could also adjust the temperature(s) of the zone(s) of the oven 13 to adapt for the differences between a desired and the measured residual moisture content. For example, if the measured residual moisture content is too low, the temperatures in the various zones could also be reduced. The controller 2 receives the measured moisture content and then determines whether or not to change the speed of the web and/or change the temperature of the oven.

As shown in FIG. 1, the backing substrate 14 is generally fed into the coating stage from a roller 11. The backing substrate 14 can have a width of any suitable dimension. The width of the substrate 14 is also referred to herein as a "web". The coating device 15 coats the film forming slurry onto the substrate 14. As shown in FIG. 1, in one embodiment, the backing paper 14a can be delaminated after the coating stage and rolled onto roll 18a. The film-forming slurry 6 is then dried in the drying oven 13 to form the film 12.

After the film 12 is dried, the backing substrate 14 and film 13 is rewound on itself onto a roll 16. As shown in FIG. 2, the silicon layer 24 of the substrate 22 is wound on top of the dry coating. The roll 16 can then be cured for a desired period of time. In one embodiment, the roll 16 can be placed in a foil bag that acts as a barrier to substantially reduce or minimize the evaporation of moisture from the film 12, as well as minimize the flashing of flavor. The roll 16 could be kept in the foil bag for any suitable period of time to complete the curing process, such as for example, approximately four days.

After the roll 16 has cured for a suitable length of time, the film 12 can be converted. This includes cutting and packaging the film 12. As shown in FIG. 1, in one embodiment where the substrate 14 has not been delaminated, the roll 16 is unwound and the substrate 14 is delaminated from the dried film 12. The substrate 14 can be rewound into a roll 18. The film 12 then travels through a cutting device 19 that cuts the web of film into any suitable number of strips along a length of the web. Each strip is then cut to a desired length to form the segments 8. The segments 8, also called strips, can then be packaged for distribution.

Figure 3:
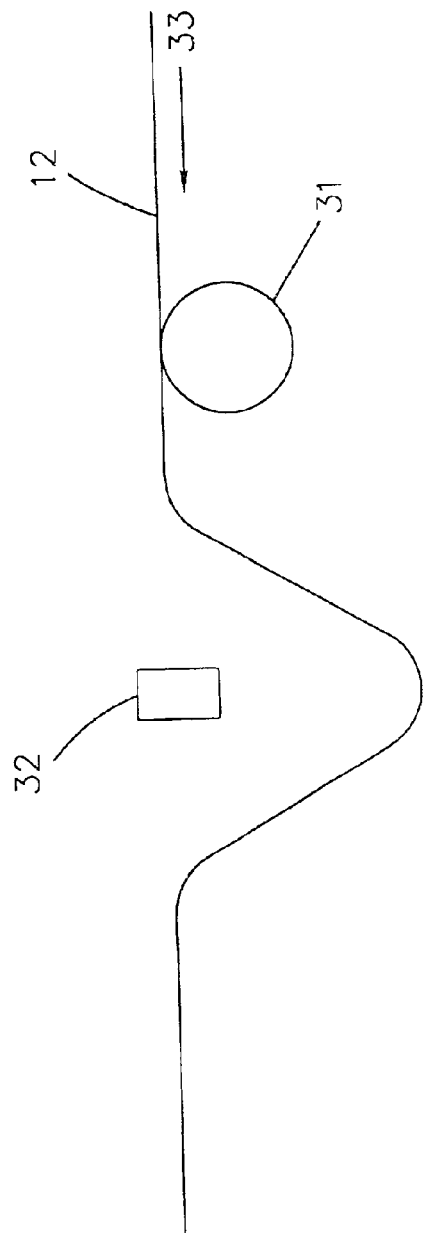
FIG. 3 is a side view of a portion of the cutting process in a system incorporating features of the present invention.

One embodiment of a converting or cutting process is described with reference to FIG. 3. As the film 12 comes off or away from the liner 14, the film 12 passes over a cutting device 31. The cutting device 31 generally comprises a series of slitters that slit or cut the film or web 12 into strips along the direction of travel 33 of the web. Tension control devices and static control devices (not shown) are used to maintain the composition of the web.

Figure 4:
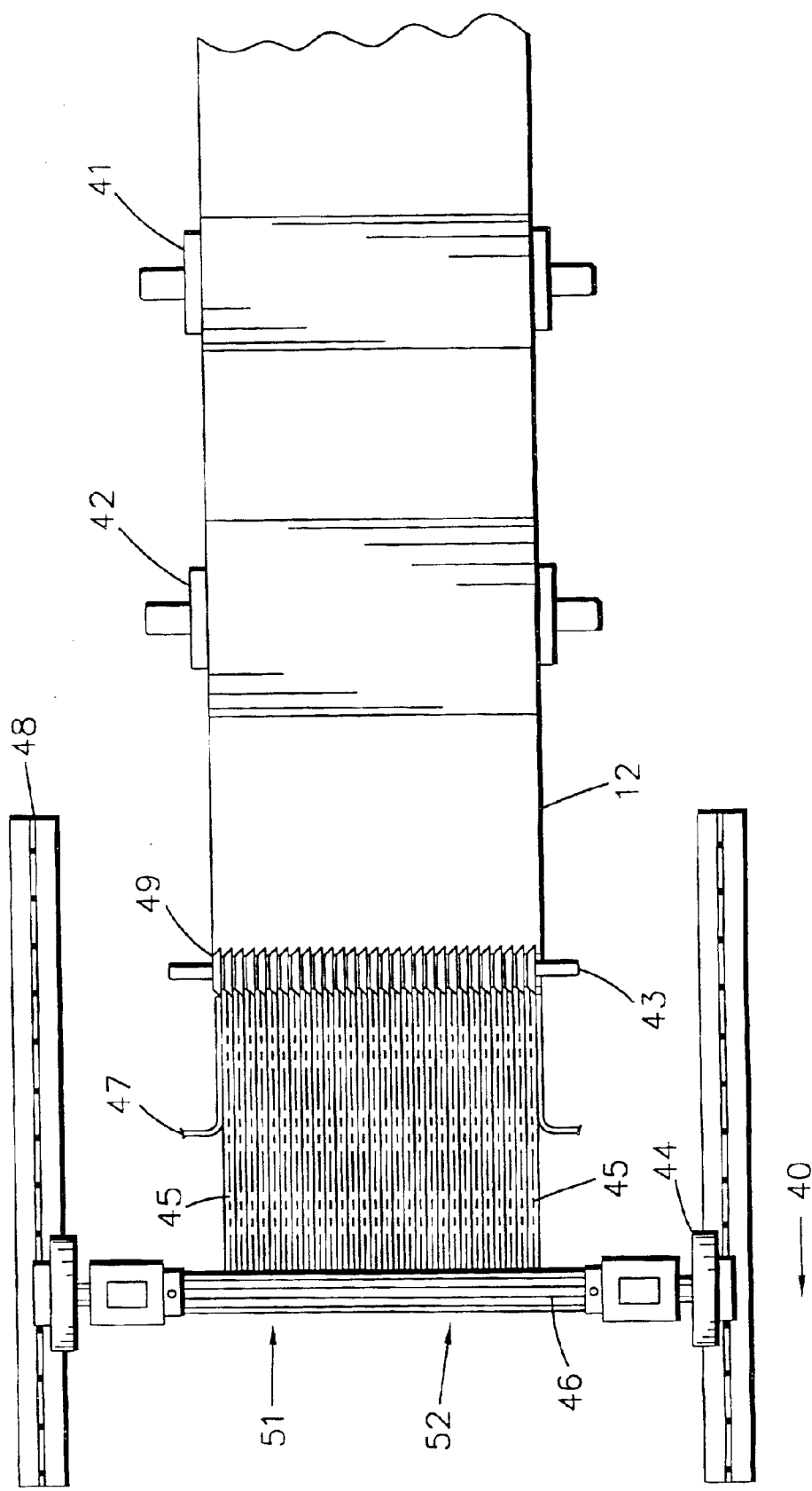
FIG. 4 is a top plan view of a cutting mechanism for a system incorporating features of the present invention.

Referring to FIG. 4, another embodiment of a converting process is illustrated. As shown in FIG. 4, the cured roll 41 of material in unwound. The backing substrate can be rewound onto a material unwind roll 42. The coated web 12 then proceeds over the slitter 43. The slitter 43 generally comprises a series of cutting devices. In one embodiment the slitter 43 comprises a device having a twenty-five slitters 49, although any suitable number of cutting devices can be used. Each individual slitter 49 cuts the web 12 along the direction of travel of the web flow 40. In the example shown in FIG. 4, after the web 12 passes through or over the slitter 43 and is cut, twenty-four separate film strips or lanes 45 are formed. The edge trim selvage 47 can be discarded.

The twenty-four strips 45 travel through a cutting device 44. In one embodiment, the cutting device 44 comprises a guillotine shear. The cutting device 44 is generally adapted to cut each strip 45 into smaller pieces or segments, such as segments 8 shown in FIG. 1. Generally, any suitable cutting device 44 can be used to cut the film strips 45 into the small pieces 8. It is a feature of the present invention to cut the film strips 45 into a size that is adapted to be inserted into the mouth, for example on or under the tongue.

After the web 12 is slitted, each strip 45 is pulled over a turnbar 46. Approximately one-half of the strips 45 can be pulled towards one side 51, while the other half can be pulled toward the other side 52. The strips 45 are pulled and make an approximately 90° turn around the turnbar 46. A gripper 53 is adapted to grip a top and bottom of each strip 45 and pull the strip 45 in approximately 1¼ inch increments. After the strips 45 are moved into position by the gripper, a guillotine cut is made. Each cut results in twelve pieces of the film strips 45 formed at each cut at each side of the turn bar 46. When a predetermined amount of cuts are made, such as for example twelve, the pieces 8 of FIG. 1 are pushed into a stack. The stack can then moved into a cassette base.

Figure 5:
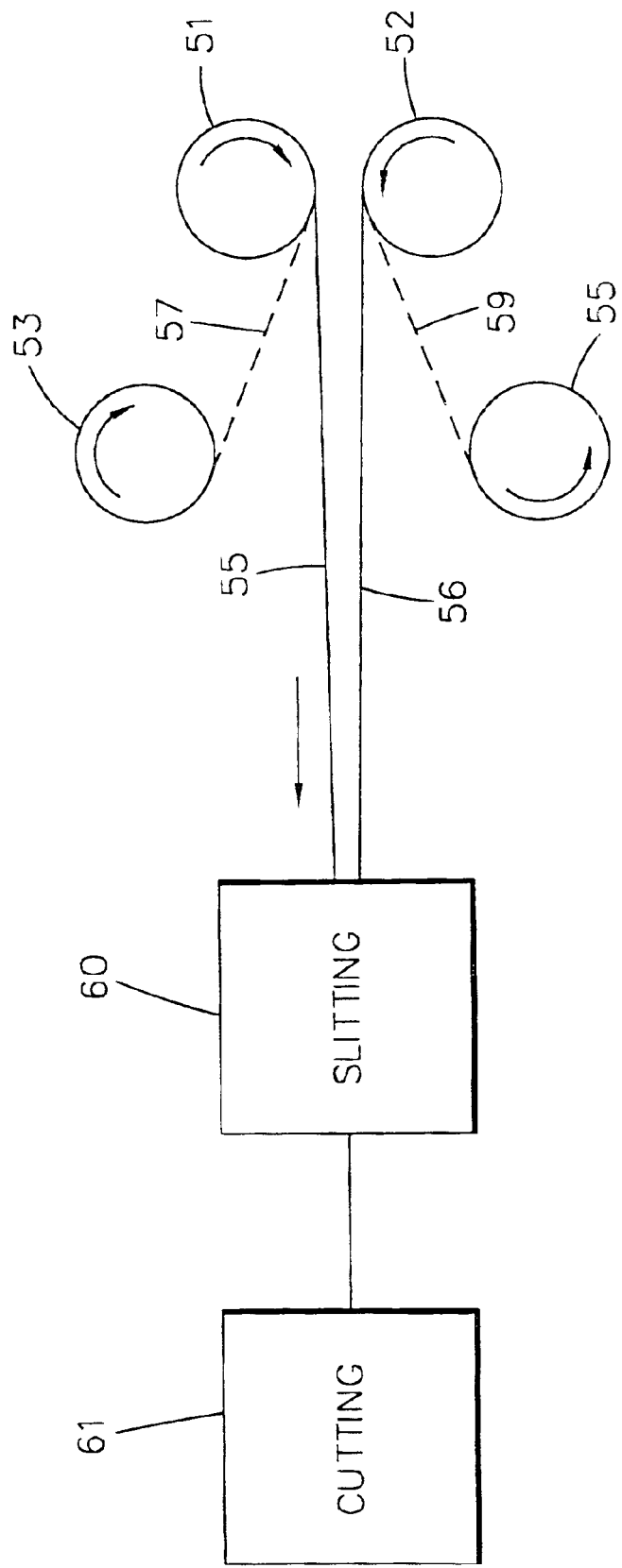
FIG. 5 is a side view of one embodiment of the converting process in accordance with features of the present invention.

In one embodiment, referring to FIG. 5, two rolls 51, 52 of cured film can be converted at the same time, one on top of the other. If not already delaminated, the backing substrate 57, 59 from each roll 51, 52 can be delaminated and rolled onto rolls 53, 55. The two webs 55, 56 of the formed film can then be processed in the slitting stage 60 and the cutting stages 61. In this fashion, 24 strips of film can be cut in a single pass of the guillotine shear 44 of FIG. 4.

Figure 6:
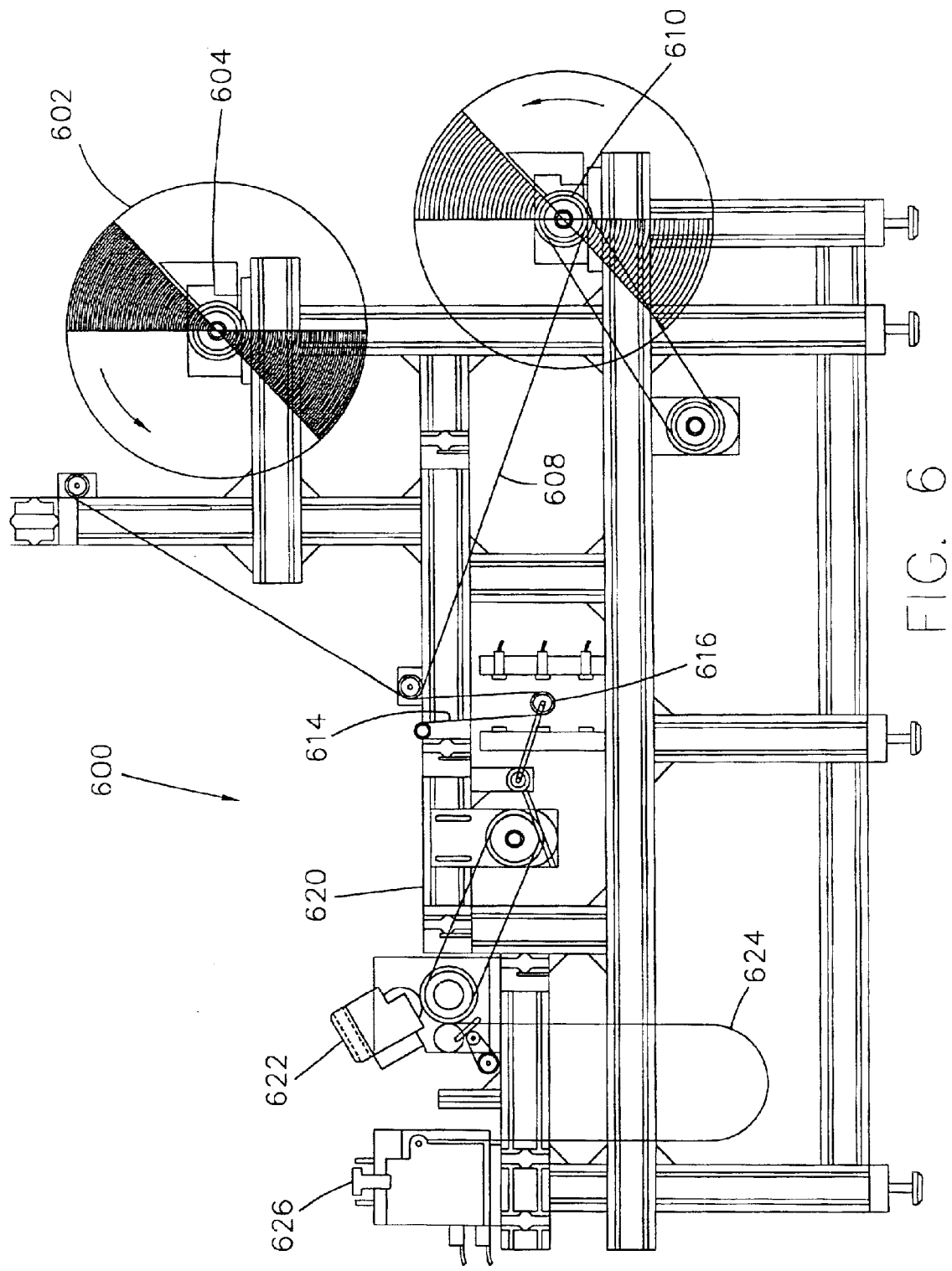
FIG. 6 is a side view of one embodiment of the converter system in a thin film manufacturing process incorporating features of the present invention.

Referring to FIG. 6, one embodiment of a system 600 for converting a thin film material into small strips is illustrated. The product strip web and carrier web 602 is placed on an unwind roll 604. The combination of the product strip web and carrier web 602, which has been cured in a process similar to that described with respect to FIG. 2, is unwound off the roll 604 and fed into a delaminating section 606, where the paper backing 608 of the carrier web is delaminated from the product strip web and rolled onto a rewind roll 610. The delaminating section 606 is adapted to allow the paper or backing to be peeled away from or off of the roll 602. In one embodiment of the invention the delaminating section 606 comprises a dancer including a counterweight 616 that allows tension to be applied to the backing paper 608 and not the product strip 614. The product strip 614 can be looped down and across to the splicing table 620.

Figure 7:
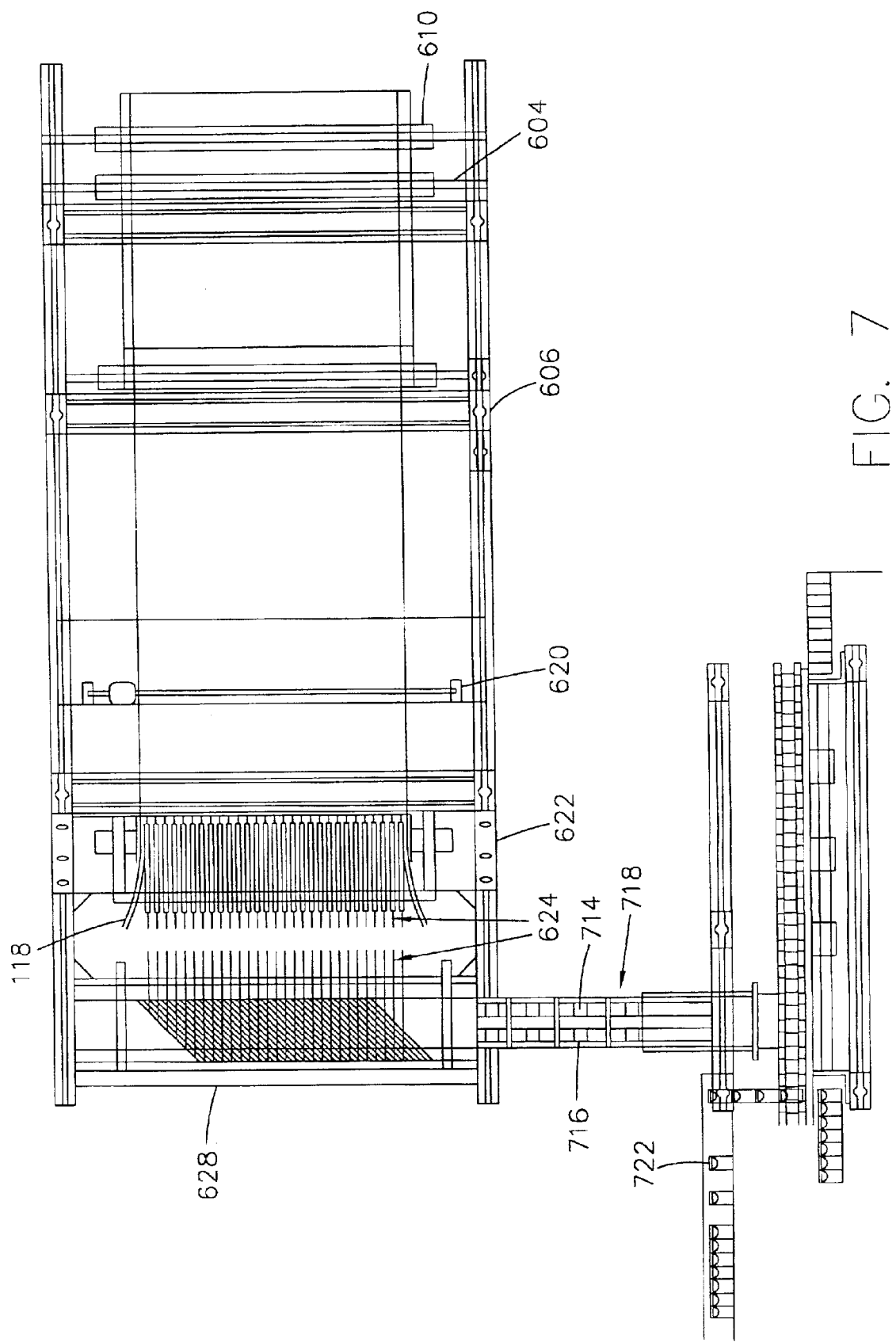
FIG. 7 is a top view of the system illustrated in FIG. 6.

The full sheet 614 is fed onto the splicing table 620 and into a cutter 622, where the sheet 614 is cut or slit lengthwise into strips. In one embodiment, the cutter 622 can comprise a DOSENBURY CRUSH CUT KNIFE ASSEMBLY, although any suitable knife assembly can be used. As shown in FIG. 7, the knife assembly 622 preferably comprise a series of twenty-five slitters to slit the full sheet into twenty-four strips 624, each approximately ⅞" wide (_____ mm). Although the strips are described as being approximately ⅞" wide, the strips 624 can be any suitable dimension. The outer strips 710, or selvage, can be discarded.

Referring to FIG. 7, the strips 624 are then pulled or directed over a turn bar assembly 628. The turn bar assembly 628 generally comprises a series of bars over which each strip 624 is directed. Each turn bar is angled at approximately 45°, which allows each strip 624 to loop over the bar and turn approximately 90°. This allows each strip 624 to be positioned one on top of another. In one embodiment, where the product web 614 is slit into twenty-four strips, all twenty-four strips can be stacked. In an alternate embodiment, the turn bars can be positioned so that where twenty-four product strips are available, two rows of twelve strips each are formed or one row of twenty-four.

A shear 626 is adapted to cut across a width of each slit strip 624. The shear or knife assembly 626 cuts each stack of strips 624 into segments, such as for example, one-inch (2.54 cm) segments. The segments, each having a plurality of one-inch product strips can then be packaged. Where twenty-four strips have been turned on top of each other, a stack of twenty-four, one-inch segments will be formed. The segments 714 shown in FIG. 7 are then moved along a conveyor 718 and deposited into suitable sized containers 722, such as for example a cassette. The containers 722 can then be transported to a labeler or other sortable processing station.

In one embodiment, the product web 614 is slitted into a series of strips 624. The strips 624 are looped down and then up across each turn bar in the turn bar assembly 628. A clamp device can be used to clamp the strip while the knife cuts the strip.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method of forming a thin film strip comprising the steps of:
   coating a liner substrate with a wet slurry of film forming ingredients;
   drying the wet slurry in a drying oven to form a film;
   measuring a moisture content of the film as the film exits in the drying oven;
   rewinding the film on itself; and
   storing the rewound film in a minimal moisture loss environment during a curing process.

2. The method of claim 1 further comprising the steps of:
   converting the film into thin strips; and
   packaging the thin strips into compact dispensers.

3. The method of claim 1 wherein the step of converting further comprises the steps of:
   slitting the film into a series of strips along a direction of travel of the web; and
   cutting each strip along a direction substantially perpendicular to the direction of travel of the web in order to form small segments of the film that are suitably sized for ingestion.

4. The method of claim 3 further comprising the step, prior to the step of cutting, of turning each strip around a turn bar, wherein approximately one half of the series of strips are turned in one direction and all remaining strips in the series are turned in an opposite direction.

5. The method of claim 1 wherein the liner is delaminated from the film after curing.

6. The method of claim 1 wherein the liner is delaminated from the slurry of film after coating.

7. The method of claim 1 wherein a first surface of the substrate comprises a polyethylene material and a second opposing side comprising a silicon material, wherein the first surface is coated with the wet slurry.

8. The method of claim 1 wherein the step of drying further comprises the step of drying the slurry in a multizone reflow oven and varying a temperature of each zone of the oven in increasing increments.

9. The method of claim 1 wherein the step of drying further comprises the step of recirculating air flowing through the oven in order to minimize an amount of flavors in the coating that is flushed off the slurry.

10. The method of claim 1 wherein the step of measuring the moisture content of the film comprises the step of using an inline infra red moisture meter to traverse at least a portion of a web of the film as it exits the drying oven to measure the moisture content.

11. The method of claim 1 further comprising the step of regulating a speed of the slurry traveling through the drying oven based upon the measure moisture content of the film as the film exits the drying oven.

* * * * *